Feb. 9, 1937.      P. H. CRAGO      2,069,874
CONTROLLING APPARATUS FOR HIGHWAY CROSSING SIGNALS
Filed April 5, 1935
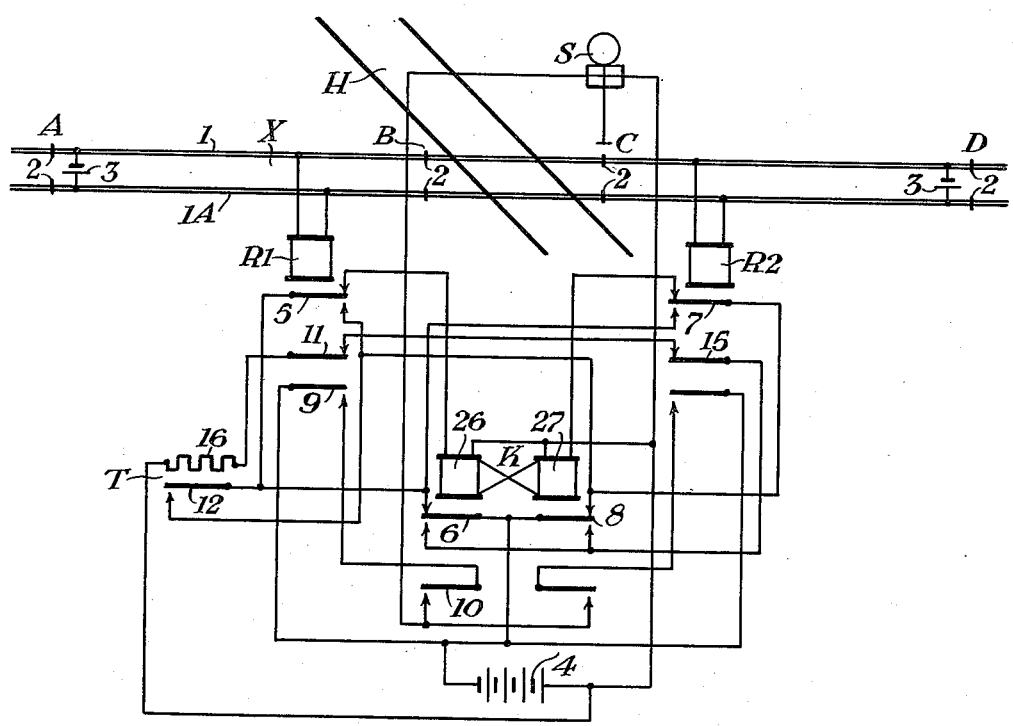
INVENTOR
*Paul H. Crago*
BY
HIS ATTORNEY Patented Feb. 9, 1937

2,069,874

UNITED STATES PATENT OFFICE 2,069,874

CONTROLLING APPARATUS FOR HIGHWAY CROSSING SIGNALS

Paul H. Crago, Wilkinsburg, Pa., assignor to The Union Switch & Signal Company, Swissvale, Pa., a corporation of Pennsylvania Application April 5, 1935, Serial No. 14,891

8 Claims. (Cl. 246—130)

My invention relates to controlling apparatus for highway crossing signals, that is, to means for the control of signals which are placed at intersections of railways and highways for the purpose of warning users of the highway when a train is approaching.

One feature of my invention is the provision of means for correctly controlling a highway crossing signal for a track on which trains move in both directions, if conditions are such that the two track sections which control the signal cannot extend through the highway crossing but are separated from each other at the crossing by a section of track which is longer than a single car or a light engine.

I will describe one form of apparatus embodying my invention, and will then point out the novel features thereof in claims.

The accompanying drawing is a diagrammatic view illustrating one form of apparatus embodying my invention.

Referring to the drawing, the rails 1 and 1A of a stretch of railway track X are divided by insulated joints 2 into sections A—B and C—D, one extending in each direction from an intersecting highway H. A track relay R, having a distinguishing suffix, according to its location, is connected across the rails 1 and 1A at one end of each of the sections A—B and C—D, and a track battery 3 is connected across the rails at the other end of each of these sections. The highway H is protected by a signal S, of any suitable type such, for example, as a bell or light signal or a combination of both, which signal is controlled in part by an interlocking relay K having a pair of windings 26 and 27, and in part by the track relays R1 and R2.

A timing device, here shown as a thermal relay T, is provided for at times controlling the windings 26 and 27 of the interlocking relay K. The relay T has a contact 12 which is open when the relay T is in its initial or deenergized condition and which becomes closed when relay T attains its operated condition a predetermined time interval after energy is applied to the heating element 16.

Under normal conditions, the track relays R1 and R2 and both windings of the interlocking relay K are all energized and the thermal relay T is deenergized. The winding 26 of the relay K is energized by virtue of a stick circuit passing from a battery 4, through front or "flagman" contact 6 of relay K, front point of contact 5 of track relay R1, and winding 26 of relay K back to battery 4. The winding 27 of relay K is energized by a stick circuit passing from battery 4, through front or "flagman" contact 8 of relay K, front point of contact 7 of track relay R2 and winding 27 of relay K back to battery 4.

I shall now assume that an eastbound car or engine, that is, a car or engine moving toward the right as shown in the drawing, travelling at normal speed, enters section A—B and causes the deenergization of track relay R1. This opens front contact 5 of relay R1 and interrupts the stick circuit just traced through this contact for winding 26 of interlocking relay K. The deenergization of winding 26 establishes a signal circuit passing from battery 4, through back contact 9 of track relay R1, back contact 10 of relay K and operating mechanism of signal S back to battery 4, thereby causing the signal S to give warning to traffic on the highway H of the approaching car or engine.

When the car departs from section A—B, the track relay R1 again becomes energized and opens its back contact 9, thereby interrupting the signal circuit previously traced through this contact and discontinuing the operation of the signal S. The energization of track relay R1 establishes a circuit passing from battery 4, through the back point of contact 6 of relay K, front contact 15 of track relay R2, front contact 11 of track relay R1 and heating element 16 of thermal relay T back to battery 4. Relay T, however, does not close its contact 12 because this relay is so adjusted that it will not attain its operated condition before the car reaches section C—D when the car is travelling at its normal speed. As will be explained hereinafter, when the car reaches section C—D energy will be disconnected from relay T.

The car next enters section C—D and causes the deenergization of track relay R2, thereby causing this relay to open the front point of its contact 7 and interrupt the circuit for winding 27 of relay K previously traced through this contact. Because the relay K, however, is of the interlocking type, the contacts operated by the winding 27 are prevented from closing at their back points, and flagman contact 8 is prevented from opening at its front point. When the front point of contact 7 of relay R2 became opened, the back point became closed to establish a pickup circuit for winding 26 of relay K passing from battery 4, through front point of flagman contact 8 of relay K, back point of contact 5 of relay R1, and winding 26 back to battery 4. This causes the energization of winding 26 of relay K and reestablishes the stick circuit for this winding previously traced through the front point of its contact 6. The releasing of relay R2 also opens its front contact 15 in the control circuit for thermal relay T so that relay T is restored to its initial condition. When the car departs from section C—D, track relay R2 again becomes energized and closes the front point of its contact 7, thereby causing the reenergization of winding 27 of relay K by virtue of the stick circuit previously traced through front point of contact 8 of this relay which was maintained closed while winding 27 was deenergized by the interlocking character of this relay. The apparatus is thus restored to its normal condition.

The thermal relay T functions to restore the interlocking relay K to its normal condition in the event a train enters either of the control sections and then reverses its direction without proceeding over the opposing control section. If, for example, an eastbound train enters section A—B and then reverses its directon so as to clear secton A—B without entering section C—D, relay R1 will be released and then picked up. The deenergization of relay R1 will open front point of its contact 5 which will deenergize winding 26 of relay K and thus cause the signal S to operate. When the train leaves secton A—B, the energization of relay R1 will open the circuit for the signal S and also will close the circuit previously described for relay T which will apply energy to heating element 16. When relay T attains its operated condition so that its contact 12 becomes closed, a pick-up circuit will be established for winding 26 which passes from battery 4, through front point of contact 8 of relay K, contact 12 of relay T, front point of contact 5 of relay R1, and winding 26 back to battery 4. Thus, relay K will be restored to its normal position.

A train of sufficient length to occupy a portion of sections A—B and C—D simultaneously will not permit relays R1 and R2 both to become energized at the same time while such train is traversing sections A—B and C—D. The relay T, therefore, does not operate for trains of a length greater than the length of section B—C when such trains are traversing sections A—B and B—C, because relay T may be energized only if both track relays R1 and R2 are in their energized conditions.

While I have not described the operation of the apparatus embodying my invention for a westbound train, it is readily apparent that such a train will cause the various parts to operate in a manner similar to that just described for the passage of an eastbound train.

Apparatus embodying my invention provides a simple and reliable means for operating a highway crossing signal at points where the two track sections which control the signal are separated from each other by a section of track which is not provided with a track circuit and which is longer than the length of a single car or light engine. Furthermore, I have provided a single time element device which is effective for restoring the apparatus to its normal condition in the event a train enters either control section and then reverses its direction without proceeding over the opposing control section.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a stretch of railway track divided into a first section and a second section, a signal, a first relay operable by a car entering said first section for operating said signal, a second relay operable by a car entering said second section for operating said signal, a timing device effective at times to control either said first relay or said second relay, and means for controlling said timing device effective when either said first section or said second section becomes unoccupied after such section has been occupied provided the other section is then unoccupied.

2. In combination, a stretch of railway track divided into a first section and a second section, a signal, a first track relay operable by a car entering said first section for operating said signal, a second track relay operable by a car entering said second section for operating said signal, an interlocking relay operable by said first and second track relays for operating said signal jointly with said first and second track relays, a timing device normally in one condition and effective when in a different condition to control said interlocking relay, and means for at times initiating the operation of said timing device provided said first and second sections are both unoccupied.

3. In combination, a stretch of railway track divided into a first section and a second section separated from said first section by a stretch of track intersected by a highway, a signal for controlling traffic over said highway at such intersection, a first track relay associated with said first section for controlling said signal for railway traffic moving in one direction, a second track relay associated with said second section for controlling said signal for railway traffic moving in an opposite direction, an interlocking relay controlled by said first and second track relays for controlling said signal jointly with said track relays, a timing device normally in one condition and effective when in a different condition to control said interlocking relay, and means for initiating the operation of said timing device effective when a car moving from one of said sections toward the other has entered the stretch between said sections provided both sections are then unoccupied.

4. In combination, a stretch of railway track divided into a first section and a second section separated by a stretch of track intersected by a highway, a signal for controlling traffic on said highway at such intersection, a first track relay associated with said first section, a second track relay associated with said second section, an interlocking relay controlled jointly by said first and second track relays, a first circuit for said signal controlled by said first track relay and by said interlocking relay, a second circuit for said signal controlled by said second track relay and by said interlocking relay, a thermal relay effective at times to control said interlocking relay, and means for at times controlling said thermal relay effective only if said first and second track relays are both energized.

5. In combination, a stretch of railway track divided into a first section and a second section separated from said first section by a stretch of track intersected by a highway, a signal for controlling traffic over said highway at such intersection, a first track relay associated with said first section for controlling said signal for railway traffic moving over said stretch in one direction, a second track relay associated with said second section for controlling said signal for railway traffic moving over said stretch in an opposite direction, a thermal relay, means for controlling said thermal relay effective only if said first and second track relays are both energized, and an interlocking relay controlled by said first and second track relays and by said thermal relay for controlling said signal jointly with said track relays.

6. In combination, a stretch of railway track intersected by a highway, said track being divided to form two sections, a track relay for each section, an interlocking relay having two magnets controlled at times by said two track relays respectively, a thermal relay controlled jointly by both of said track relays and said interlocking relay, a first pick-up circuit for each magnet each such circuit controlled by both of said track relays and by the other magnet, a second pick-up circuit for each magnet each such circuit controlled in part by said thermal relay, a stick circuit for each magnet each such circuit controlled by the respective track relay, and a highway crossing signal located at said intersection and controlled by said interlocking relay.

7. In combination, a stretch of railway track intersected by a highway, said track being divided to form two sections, a track relay for each section, an interlocking relay having two magnets controlled at times by said two track relays respectively, a thermal relay at times effective to control one or the other of said magnets, a first circuit for said thermal relay including a front contact of each of said two track relays and a back contact of one magnet, a second circuit for said thermal relay including a front contact of each of said two track relays and a back contact of the other magnet, and a highway crossing signal located at said intersection and controlled by said interlocking relay.

8. In combination, a stretch of railway track intersected by a highway, said track being divided to form two spaced sections extending in opposite directions from the highway, a track relay for each section, an interlocking relay controlled at times by said two track relays respectively, a thermal relay normally in an initial condition and effective when in its operated condition to control one or the other of said magnets, means for initiating the operation of said thermal relay when a car leaves one section and enters the space between the sections, means for causing said thermal relay to assume its initial condition when the car enters the other section, and a highway crossing signal located at said intersection and controlled by said interlocking relay.

PAUL H. CRAGO.